(12) United States Patent
Ellison-Taylor

(10) Patent No.: US 6,493,004 B1
(45) Date of Patent: Dec. 10, 2002

(54) DELAYED TRANSMISSION OF CONTROLS FROM A SERVER TO A CLIENT

(75) Inventor: Ian M. Ellison-Taylor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 08/557,480

(22) Filed: Nov. 14, 1995

(51) Int. Cl.$^7$ .................................................. G06F 3/00
(52) U.S. Cl. ........................................ 345/804; 345/806
(58) Field of Search .................................. 395/340, 326, 395/339, 342, 341, 200.01, 128, 332, 335, 329, 396, 357

(56) References Cited

U.S. PATENT DOCUMENTS

| | | | | |
|---|---|---|---|---|
| 4,893,307 A | * | 1/1990 | McKay et al. ............... | 370/94.1 |
| 5,021,949 A | * | 6/1991 | Morten et al. ............... | 369/200 |
| 5,329,619 A | * | 7/1994 | Page et al. ................... | 395/200 |
| 5,544,320 A | * | 8/1996 | Konrad ........................ | 395/200.09 |
| 5,548,726 A | * | 8/1996 | Pettus ......................... | 395/200.09 |
| 5,594,921 A | * | 1/1997 | Pettus ......................... | 395/831 |
| 5,600,644 A | * | 2/1997 | Chang et al. ................ | 390/404 |

OTHER PUBLICATIONS

*Netscape Navigator*, Jason Manger, McGraw–Hill, Berkslin, England, Sep. 1995 pp. 22–37, 68–70, 95–97, 277.*

Kapinski, Richard, "Hot Java Browser Set for Windows," Communications Week, Sep. 11, 1995, pp. 89 and 90.

Quercia, Valerie, and Tim O'Reilly, "X Window System User's Guide for XII Release 5," The Definitive Guides to the X Window System, vol. 3, Sep. 1993, Chapter 1, pp. 5–19; Chapter 3, pp. 33–62; and Chapter 10, pp. 265–302.

Kapinski, Richard, "Hot Java Browser Set for Windows," Communications Week, Sep. 11, 1995, pp. 89 and 90.

* cited by examiner

*Primary Examiner*—Steven Sax
(74) *Attorney, Agent, or Firm*—Christensen O'Connor Johnson Kindness PLLC

(57) ABSTRACT

A server optionally may delay the transmission of a child window control to a client in order to reduce transmission time of a document that includes the child window control. After a non-negligible period of time elapses, the server may transmit the child window control to the client transparently relative to the user of the client. The child window control may be transmitted to the client in the background mode of operation. This approach is especially well adopted for use in the transmission of web pages from a server to a client.

15 Claims, 3 Drawing Sheets

“DELAYED TRANSMISSION OF CONTROLS FROM A SERVER TO A CLIENT”

TECHNICAL FIELD

The present invention relates generally to computer systems and more particularly to transmission of documents from a server to a client.

BACKGROUND OF THE INVENTION

With the increasing popularity of the Internet, many people are trying to embellish web pages to include richer custom child window controls ("controls"). A control is a predefined child window that carries out a specific kind of input or output. A control is typically given its own window class that defines a window procedure for the control and that identifies attributes for the control. One difficulty that is encountered with including controls on web pages relates to transmission time. In particular, transmitting a document from a server to a client when the document includes a control takes a great deal of time. Since many users typically act in a browsing mode where they wish to quickly jump from web page to web page, the substantial delay caused by the transmission of the control can be particularly frustrating.

SUMMARY OF THE INVENTION

The present invention eliminates the substantial delay caused by the immediate transmission of the control to a client. In accordance with an aspect of the present invention, a method is practiced in a distributed system that has a server and a client. Per this method, a document that includes a child window control is provided at the server. A request to receive a copy of the document is received at the server from the client. The document is transferred to the client such that the child window control is not initially transferred. Instead, drawing commands are transferred to the client from the server to draw a dummy window that has a like appearance to the child window control. Subsequently, the child window control may be transferred from the server to the client after a non-negligible predetermined period of time. Preferably, the child window control is transferred in a fashion that is transparent to a user. The child window control may be received and processed by the client in a background mode of processing. This method is especially useful in transferring web pages as documents.

BRIEF DESCRIPTION OF THE DRAWINGS

A preferred embodiment of the present invention will be described in more detail below relative to the following figures.

DETAILED DESCRIPTION OF THE INVENTION

The preferred embodiment of the present invention provides a mechanism for quickly transmitting documents from a server to a client by delaying the transmission of controls in the documents. Since the controls are not immediately transmitted, the delay incurred by transmitting such controls is not incurred. Thus, users that are browsing web pages may quickly see the contents of the web pages. If the user decides to continue viewing a web page, the control is transmitted after a predetermined delay from the server to the client in the background in a fashion that is transparent to the user. The window associated with the control appears to the user like a typical control, but is actually initially displayed through drawing commands sent from the server to the client. In addition, a proxy control is created at the client to act on behalf of the child window control at the server.

Figure 1:
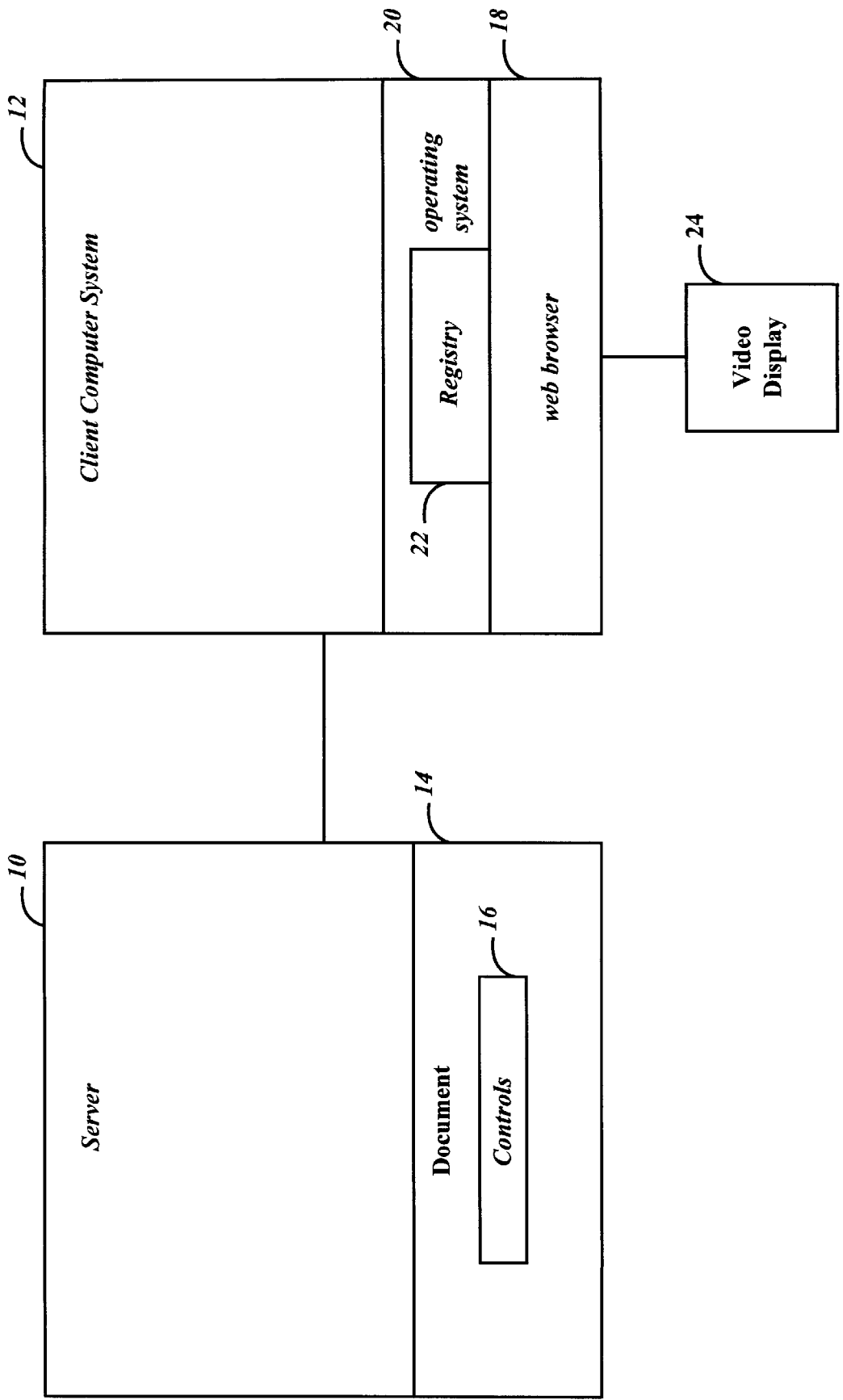
FIG. 1 is a block diagram of a distributed system that is suitable for practicing the preferred embodiment of the present invention.

FIG. 1 illustrates a suitable system for practicing the preferred embodiment of the present invention. The system includes a server computer system ("server") 10 and a client computer system 12 ("client"). The server 10 holds a copy of a document 14, such as a web page. For illustrative purposes in the discussion below, it is assumed that the document is encoded in the HyperText Markup Language (HTML). In an example shown in FIG. 1, the document includes multiple controls 16. Nevertheless, those skilled in the art will appreciate that the present invention may also work with documents that contain only a single control.

The client 12 includes an operating system 20. For illustrative purposes in the discussion below, it is assumed that the operating system is an embellished version of the Microsoft® Windows® 95 Operating System sold by Microsoft Corporation of Redmond, Washington. The operating system 20 includes a registry 22 that holds configuration information. The role of the registry 22 in the preferred embodiment of the present invention will be described in more detail below. The client 12 also holds a copy of a web browser 18 that is used to browse web pages on the World Wide Web portion of the Internet. A video display 24 is coupled to the client 12 to view video information.

Figure 2A:
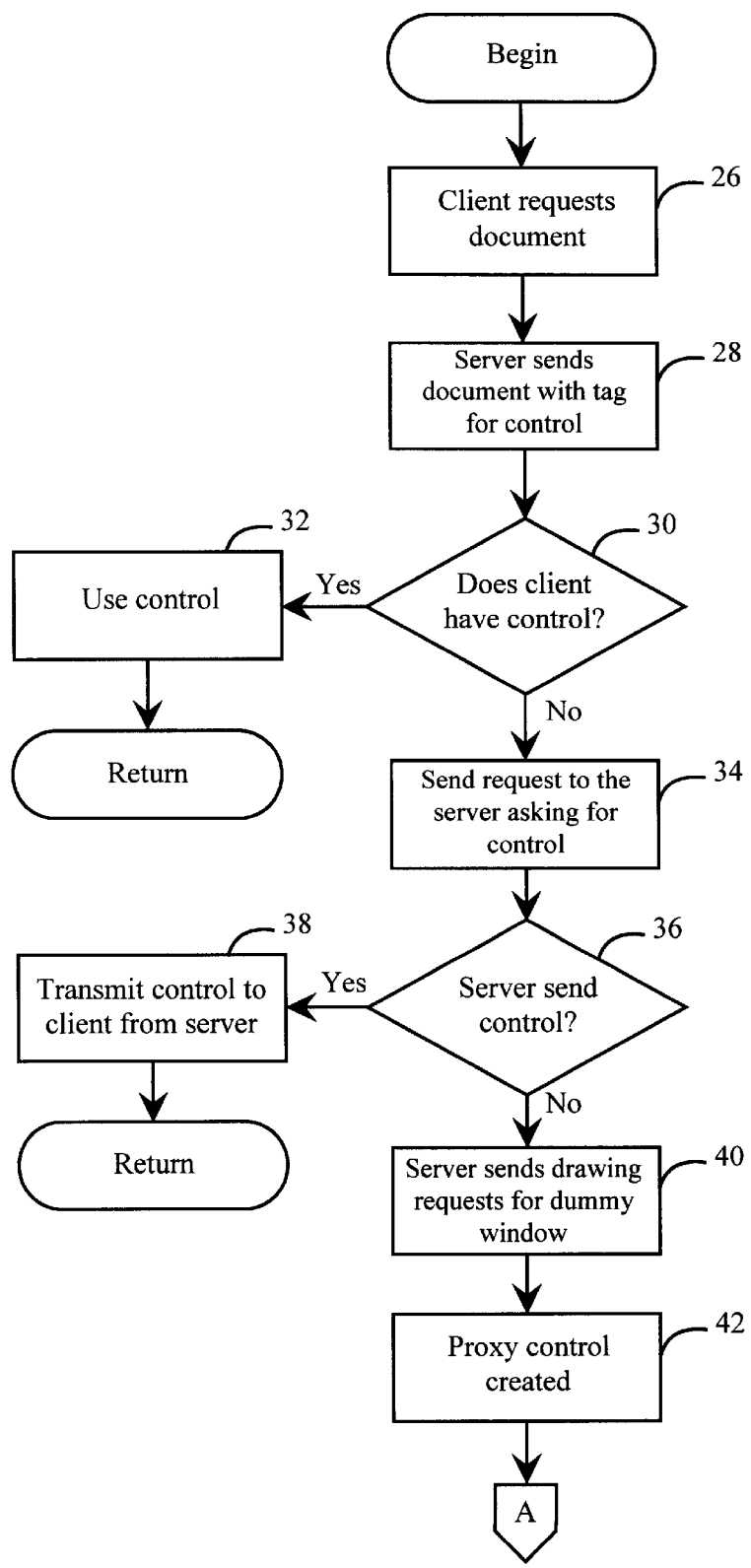
FIGS. 2A and 2B depict a flowchart that illustrates the high-level steps that are performed by the preferred embodiment of the present invention.
Figure 2B:
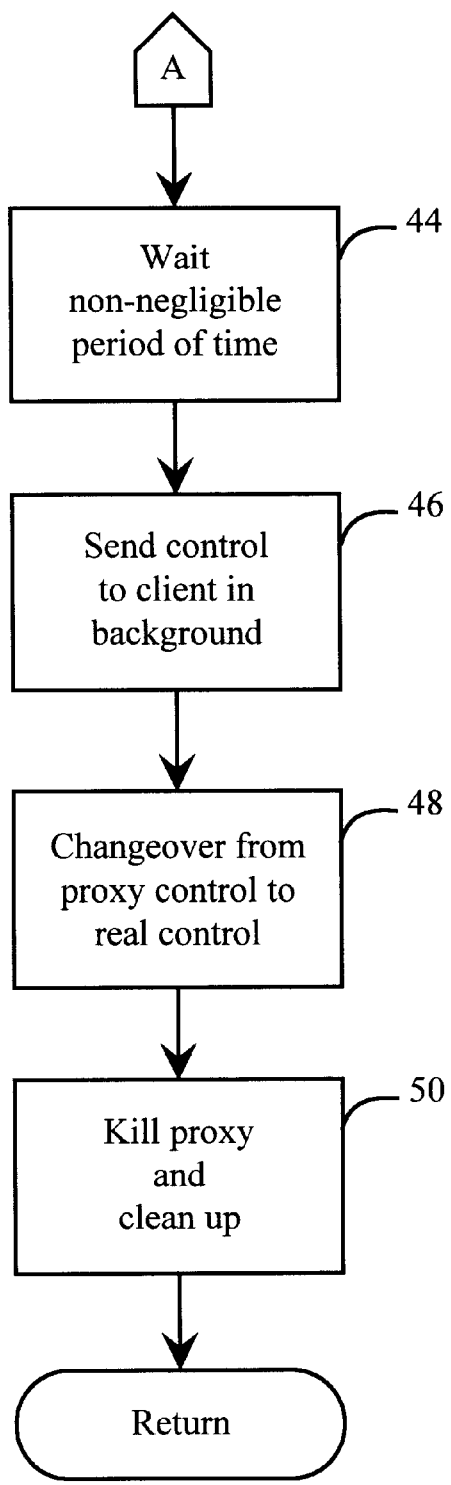

FIGS. 2A and 2B illustrate the steps that are performed by the preferred embodiment of the present invention in transferring a document that contains a control from the server 10 to the client 12. For purposes of the discussion below, it is assumed that the HyperText Transfer Protocol (HTTP) is being used. Additionally, the client 12 requests the document 14 from the server 10 (step 26 in FIG. 2A). The client does this by sending a full request message that specifies the GET method. The request includes a Uniform Resource Locator (URL) or other location information for locating the document that is being requested. In response to the request, the server 10 sends a version of the document in the HTML format with tags delimiting each control in the document (step 28 in FIG. 2A). A tag is a group of syntactically delimited characters that are added to data of a document in order to delimit an element. The preferred embodiment to the present invention embellishes the standard HTML format to define a "control" tag. The web browser 18 includes code for recognizing such a tag.

The client 12 looks at the transmitted document 14 and identifies the "control" tag. The client 12 then looks at the registry 22 to determine whether the client has the control or not (step 30 in FIG. 2A). As is described in more detail in copending application entitled "SYSTEM-PROVIDED CHILD WINDOW CONTROLS," Ser. No. 08/355,400, which is assigned to a common assignee with the present application and which is explicitly incorporated by reference herein, window classes are defined for each type of control. These control window classes are registered within the registry 22. Thus, when the client receives the document 14 and identifies a "control" tag which is followed by an identifier that identifies the control, the client 12 looks into the registry 22 to see if the identified control is currently registered. If the client 12 has the control, the client uses the control (step 32 in FIG. 2A). On the other hand, if the client 12 does not find the control in the registry 22, a number of additional steps must be performed.

Where the client 12 does not find the control in the registry 22, the client sends a request to the server 10 asking for the control (step 34 in FIG. 2A). The request may take the form of a typical HTTP request. The server 10 then decides whether or not to send the control or alternatively to drawing requests (step 36 in FIG. 2A). The preferred embodiment of the present invention leaves the decision on whether to send the control immediately or to delay the sending of the control (in favor of sending drawing requests) to the discretion of the server 10. Those skilled in the art will appreciate that a number of different criteria may be applied to determine whether or not to send the control at this time. If the server 10 decides to send the control, the control is transmitted to the client 12.

When the server 10 decides to not immediately send the control, a drawing request to draw a window that has the appearance of a control is sent instead of the control (step 40 in FIG. 2A). The preferred embodiment of the present invention defines a new application program interface (API), denoted as Remote( ) that forwards data over a wire. If the destination is a remote destination, the commands are forwarded to the remote destination. If the destination is a local destination, the API locally calls the appropriate functions. The drawing commands may be typical drawing commands as found in the Microsoft® Windows® 95 Operating system, including FillRect( ) LineTo( ), and the like.

The client 12 creates a proxy control that acts as a proxy for the control at the server 10 (step 42 in FIG. 2A). The preferred embodiment of the present invention defines an API denoted as CreateProxyControl( ) that returns a handle to the window for the proxy control. The server 10 creates a thread so that it can handle messages from multiple clients and loads the DLL that implements the control. This DLL is passed a handle to the client proxy.

The preferred embodiment of the present invention then waits a non-negligible period of time, such as five seconds, before performing additional actions relative to the control (step 44 in FIG. 2B). The idea behind the wait is to ensure that the user is not merely browsing at the document but rather intends to work further with the document. If the user intends to work further with the document, the control needs to be downloaded from the server 10 to the client 12. After the wait period elapses, the control is sent to the client 12 in the background (step 46 in FIG. 2B). The client 10 supports a background mode of operation and a foreground mode of operation. The background mode of operation is operates at a lower priority than the foreground mode of operation. Since the control is sent. in the background and because there are no obvious visual effects to the user, the transmission of the control is transparent to the user.

Once the control has been fully transmitted from the server 10 to the client 12, the client must change from using the proxy control to using the real. control (step 48 in FIG. 2B). This changeover involves a number of different steps. The client 12 tells the server 10 to save state information that is associated with the control. For example, with a scroll bar control, the server may be save state information regarding the current position of the slider within the scroll bar. The server 10 then packages the state information and sends it to the client 12. Any user actions that occur during this transmission may be queued. A window for the control is then created on top of the proxy window and a restore message is sent to restore the state of the control that has been sent from the server 10. The system must then remove the proxy control and perform various cleanup tasks (step 50 in FIG. 2B). The housekeeping tasks that may be performed at the client include registering the control within the registry 22. The client 12 tells the server 10 to clean up the server the side.

As there is the possibility with the preferred embodiment of the present invention of a large number of controls accumulating at the client 12, a mechanism may be provided for aging out controls or eliminating controls when they occupy too much disk space.

While the present invention has been described with reference to a preferred embodiment thereof, those skilled in the art will appreciate that various changes in form and detail may be made without departing from the intended scope of the present invention as defined in the appended claims.

What is claimed is:

1. In a distributed system having a server and a client, a method comprising the steps of:

provided a document at the server that includes a child window control;

receiving a request at the server from the client to receive a copy of the document; and transferring the document to the client wherein the child window control is not initially transferred as part of the transferring of the document and wherein drawing commands are transferred to the client from the server to draw a dummy window that has a like appearance to the child window control.

2. The method of claim 1, further comprising the step of transferring the child window control from the server to the client after a non-negligible predetermined period of time in a fashion that is transparent to a user.

3. The method of claim 2 wherein the computer system supports a background mode of operation and wherein the transferring of the child window control from the server to the client occurs in the background mode of operation.

4. The method of claim 1 wherein the document is a web page.

5. In a system having a server and a client having a video display, a method comprising the steps of:

receiving a request at the server to forward a document to the client, said document including a child window control;

transferring the document without the child window from the server to the client;

sending drawing commands from the server to the client to draw a dummy control that has the appearance of the child window control on the video display of the client; and creating a proxy control at the client to act on behalf of the child window control.

6. The method of claim 5, further comprising the step of transferring the child window control from the server to the client after a non-negligible period of time in a fashion that is transparent to a user of the client.

7. The method of claim 6, further comprising the step of replacing the proxy control at the client with the child window control that has been transferred from the server.

8. The method of claim 6 wherein the client maintains a registry of configuration information and wherein the method further comprises the step of registering the child window control that has been transferred from the server in the registry.

9. The method of claim 6 wherein the document is a web page.

10. A server comprising:
a storage for storing a document that includes a child window control;
a document transmitter for transmitting at least a portion of the document that does not include the child window control to a client;
a drawing command transmitter for transmitting drawing commands to the client to draw a dummy control at the client in place of the child window control that was not transferred; and
a child window control transmitter for transmitting the child window control to the client a predetermined non-negligible amount of time after the document was transmitted by the document transmitter to the client.

11. The server of claim 1 wherein the child window control transmitter transmits the child window control to the client in a fashion that is transparent to a user of the client.

12. At a client that interacts with a server, a method comprising the steps of:
requesting a document from the server, wherein said document includes a child window control;
receiving a portion of the document that does not include the child window control;
determining that the child window control was not received and in response, creating a proxy control at the client to act on behalf of the child window control; and
receiving and executing drawing commands for the server to draw a dummy window for the child window control.

13. A client computer system for interacting with a server, comprising:
a document requester for requesting a document with a child window control from the server;
a document receiver for receiving the document from the server, said document not including the child window control;
a drawing command receiver for receiving drawing commands from the server to draw a dummy window in place of the child window control in the document at the client; and
a proxy control creator for creating a proxy control at the client to act on behalf of the child window control.

14. The client computer system of claim 13, further comprising:
a child window control receiver for receiving the child window control from the server in a fashion that is transparent to a user of the client computer system.

15. At a server that interacts with a client, a method comprising the steps of:
receiving a request for a document that includes a child window control from the client;
transmitting the document without the child window control to the client; and
after a non-negligible amount of time, transmitting the child window control to the client in a fashion that is transparent to a user of the client.

* * * * *

UNITED STATES PATENT AND TRADEMARK OFFICE
CERTIFICATE OF CORRECTION

PATENT NO. : 6,493,004 B1
DATED : December 10, 2002
INVENTOR(S) : I.M. Ellison-Taylor It is certified that error appears in the above-identified patent and that said Letters Patent is hereby corrected as shown below:

Title page,
Item [56], References Cited, OTHER PUBLICATIONS,
"Berk- slin," should read -- Berk-shire, --
Delete in its entirety the second occurrence of "Kapinski, Richard, "Hot Java Browser Set for Windows," Communications Week, Sep. 11, 1995, pp. 89 and 90."
Item [57], ABSTRACT,
Line 8, "adopted" should read -- adapted --

Column 2,
Line 51, "embodiment to" should read -- embodiment of --
Line 59, "copending" should read -- co-pending --

Column 3,
Line 11, "drawing requests" should read -- send drawing requests --
Line 25, "Remote( )" should read -- Remote( ), --
Line 32, "FillRect( )" should read -- FillRect( ), --
Line 40, "passed a handle" should read -- passed as a handle --
Line 52, "operation is operates" should read -- operation operates --
Line 54, "sent. in" should read -- sent in --
Line 59, "real. control" should read -- real control --
Line 63, "may be save" should read -- may save --

Column 4,
Line 8, "server the side." should read -- server side. --
Line 37, "claim 2" should read -- claim 2, --
Line 41, "claim 1" should read -- claim 1, --
Line 63, "claim 6" should read -- claim 6, --

UNITED STATES PATENT AND TRADEMARK OFFICE
CERTIFICATE OF CORRECTION

PATENT NO. : 6,493,004 B1
DATED : December 10, 2002
INVENTOR(S) : I.M. Ellison-Taylor It is certified that error appears in the above-identified patent and that said Letters Patent is hereby corrected as shown below:

Column 5,
Line 1, "claim 6" should read -- claim 6, --
Line 18, "claim 1" should read -- claim 1, --

Signed and Sealed this

First Day of July, 2003

JAMES E. ROGAN
*Director of the United States Patent and Trademark Office*